United States Patent
Melack et al.

(10) Patent No.: US 10,625,870 B1
(45) Date of Patent: Apr. 21, 2020

(54) SECURED LINES FOR BALLISTIC RECOVERY SYSTEM

(71) Applicant: Wisk Aero LLC, Mountain View, CA (US)

(72) Inventors: John Melack, Redwood City, CA (US); Cody Patrick Leuck, Saratoga, CA (US); Sheldon Wong, Redwood City, CA (US)

(73) Assignee: WISK AERO LLC, Mountain View, CA (US)

( * ) Notice: Subject to any disclaimer, the term of this patent is extended or adjusted under 35 U.S.C. 154(b) by 0 days.

(21) Appl. No.: 16/408,118

(22) Filed: May 9, 2019

(51) Int. Cl.
*B64D 17/62* (2006.01)
*B64D 17/72* (2006.01)
*B64C 29/00* (2006.01)
*B64D 17/80* (2006.01)

(52) U.S. Cl.
CPC ........ *B64D 17/725* (2013.01); *B64C 29/0091* (2013.01); *B64D 17/62* (2013.01); *B64D 17/80* (2013.01)

(58) Field of Classification Search
CPC ...... B64D 17/725; B64D 17/80; B64D 17/62; B64C 29/0091; B65H 75/362
USPC ...................................................... 244/137.3
See application file for complete search history.

(56) References Cited

U.S. PATENT DOCUMENTS

| | | | | |
|---|---|---|---|---|
| 2,366,764 A * | 1/1945 | Wilson | ................. | B64D 17/00 244/148 |
| 2,749,066 A * | 6/1956 | Barnes | ................. | B64D 17/52 244/148 |
| 2,933,272 A * | 4/1960 | Sinclair | ................. | B64D 17/36 244/113 |
| 2,981,505 A * | 4/1961 | Oakley | ................. | B64D 17/68 244/149 |
| 3,087,694 A * | 4/1963 | Sepp, Jr. | ................. | B64D 17/52 244/141 |
| 3,145,956 A * | 8/1964 | Widdows | ................. | B64D 17/34 244/147 |
| 3,188,027 A * | 6/1965 | Sepp, Jr. | ................. | B64D 17/80 244/147 |
| 4,087,063 A * | 5/1978 | Caffey | ................. | B64D 17/40 244/147 |
| 4,693,436 A * | 9/1987 | Gold | ................. | B64D 17/76 244/149 |
| 5,233,126 A * | 8/1993 | Vogt | ................. | F42B 10/50 102/339 |
| 6,199,799 B1 * | 3/2001 | Lai | ................. | B64C 27/006 244/139 |
| 6,223,659 B1 * | 5/2001 | Garcia | ................. | B65H 75/362 102/504 |

(Continued)

*Primary Examiner* — Claude J Brown
(74) *Attorney, Agent, or Firm* — Kilpatrick Townsend & Stockton LLP

(57) ABSTRACT

A parachute is coupled to a rocket where the parachute is extracted by having the rocket pull on the parachute. A parachute strap couples the parachute to an aircraft where at a first point in time, a first section of the parachute strap and a second section of the parachute strap are both secured independently of each other. At a second point in time, the second section of the parachute strap is still secured while the first section of the parachute strap is released where the released first section of the parachute strap gradually becomes taut as the parachute is extracted.

30 Claims, 7 Drawing Sheets

(56) References Cited

U.S. PATENT DOCUMENTS

| | | | | |
|---|---|---|---|---|
| 8,328,141 | B2 * | 12/2012 | Caldwell | B64D 17/40 244/147 |
| 10,099,792 | B1 * | 10/2018 | Swan | B64D 17/725 |
| 2005/0087652 | A1 * | 4/2005 | Holmboe | B64C 27/006 244/139 |
| 2007/0005107 | A1 * | 1/2007 | Janota | A61B 17/1322 606/203 |
| 2012/0011996 | A1 * | 1/2012 | Glasson | F41H 11/04 89/36.17 |
| 2017/0233086 | A1 * | 8/2017 | Homan | B64D 17/72 244/139 |

* cited by examiner

US 10,625,870 B1

SECURED LINES FOR BALLISTIC RECOVERY SYSTEM

BACKGROUND OF THE INVENTION

Some, but not all, types of aircraft include parachutes for emergency landing. Depending upon where the parachute is located in the aircraft and the aircraft's arrangement of parts, there may be deployment issues that are only revealed when the parachute is integrated into the aircraft and tested. For example, certain part(s) of the aircraft may interfere with the deployment of the parachute. New techniques and/or devices that address such deployment issues would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a ballistic recovery system (BRS) are described herein which are designed to mitigate or otherwise avoid tangling of parachute straps or lines (e.g., with an aircraft's pusher prop). First, an example aircraft with a BRS is described (e.g., to provide context). Then, various embodiments of the BRS which are designed to avoid strap tangling are described.

Figure 1:
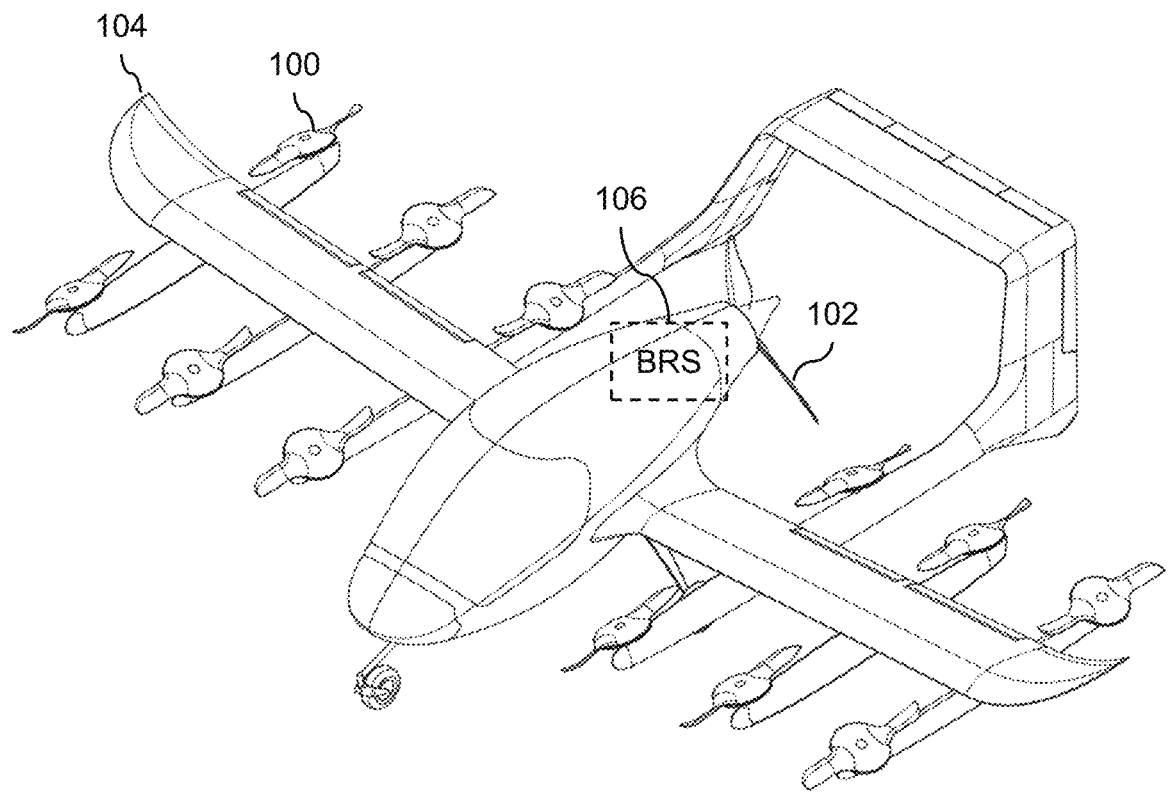
FIG. 1 is a diagram illustrating an embodiment of an aircraft. In this example, the aircraft is capable of performing vertical takeoffs and landings.

FIG. 1 is a diagram illustrating an embodiment of an aircraft. In this example, the aircraft is capable of performing vertical takeoffs and landings. To do this, the aircraft has two sets of propellers. To take off vertically, 12 vertical lift fans (100) are turned on to provide vertical or downward thrust. Once the aircraft is airborne, a propeller (102) which is mounted to the rear of the fuselage is turned on to provide forward movement of the aircraft. This propeller is sometimes referred to herein as a pusher prop because it pushes the aircraft forward. Once the aircraft is moving forward at a sufficient speed to achieve a sufficient lift force on the wings (104) to keep the aircraft airborne without downward thrust from the vertical lift fans (100), the vertical lift fans (100) are turned off. To land, the aircraft has the option of turning the vertical lift fans (100) back on and turning off the pusher prop (102) to land vertically. Alternatively, the vehicle can perform a traditional, wing-borne landing by keeping the pusher prop (102) on and keeping the vertical lift fans (100) off.

For safety, the exemplary aircraft shown here includes a ballistic recovery system (106) enclosed inside the fuselage, behind the cockpit. For example, due to relatively low expected flight altitudes, the rocket in a BRS system will help to more quickly inflate the parachute so that the aircraft does not free fall too much before the parachute (e.g., fully) inflates. This is especially useful for aircraft (such as the one shown here) which fly at lower altitudes. The rocket also helps to inflate the parachute if the BRS system is ignited when the aircraft is hovering mid-air (e.g., the vertical lift fans (100) are on and the pusher prop (102) is off).

One potential problem with the arrangement shown here is that the parachute strap(s) (e.g., that couple and/or are between the parachute and the aircraft) can become tangled in the pusher prop (102). For example, if the vehicle is flying forwards with the pusher prop (102) turned on and the vertical lift fans (100) turned off, the forward movement of the aircraft can cause the parachute strap(s) to become tangled in the pusher prop. Even if the aircraft is hovering mid-air with the pusher prop (102) off and the vertical lift fans (100) on, the parachute strap(s) could become tangled in the pusher prop (102) due to the close proximity. This is dangerous because it can slow or even prevent the inflation of the parachute during an emergency scenario.

The following figures describe various embodiments of parachute straps that are configured to reduce the likelihood of tangling (e.g., with or in a pusher prop).

Figure 2:
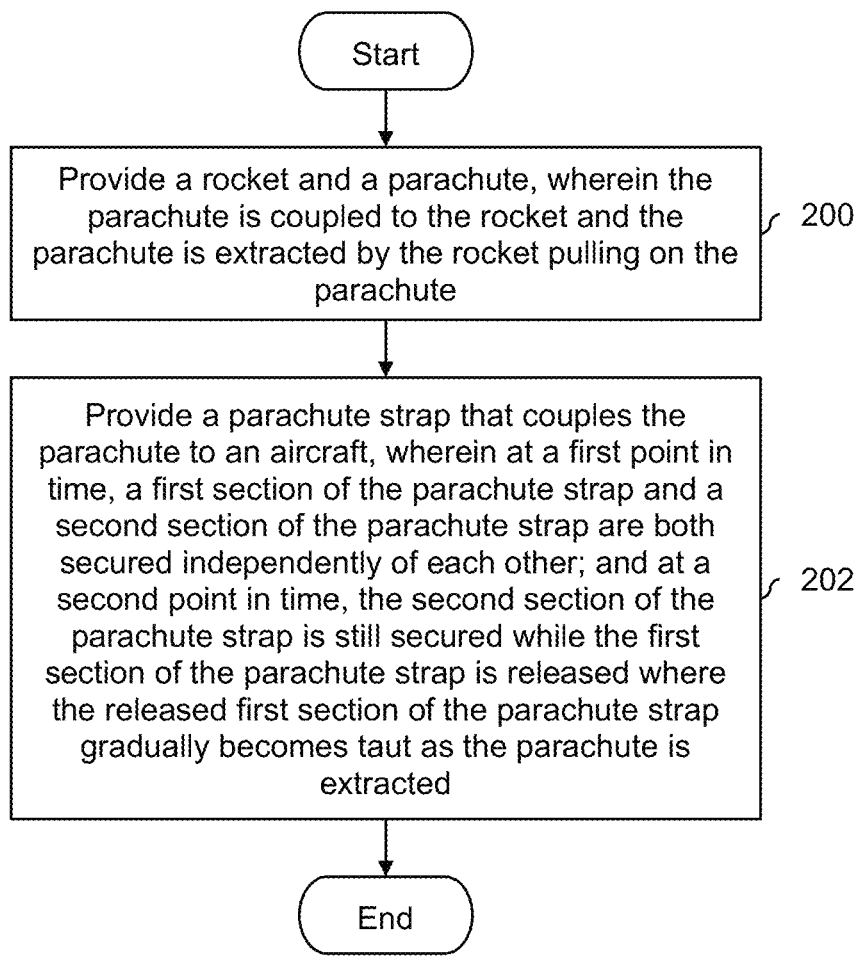
FIG. 2 is a flowchart illustrating an embodiment of a process to provide a ballistic recovery system that reduces the likelihood of parachute strap(s) becoming tangled with the aircraft.

FIG. 2 is a flowchart illustrating an embodiment of a process to provide a ballistic recovery system that reduces the likelihood of parachute strap(s) becoming tangled with the aircraft. For example, BRS (106) in FIG. 1 may perform this technique and/or be configured in this manner so that in the event BRS 106 is deployed, the parachute line(s) will not become tangled with nearby parts of the aircraft (e.g., pusher prop 102).

At 200, a rocket and a parachute are provided, wherein the parachute is coupled to the rocket and the parachute is extracted by the rocket pulling on the parachute. For example, BRS 106 in FIG. 1 may include a packed parachute that is contained in some bag, housing, or other container. In the event the flight computer or pilot decides to use the parachute, the parachute is extracted by igniting the rocket. The ignited rocket breaks through the fuselage from the inside and pulls the parachute out (e.g., via one or more lines or straps that couple the rocket to the (top of) the parachute).

At 202, a parachute strap is provided that couples the parachute to an aircraft, wherein at a first point in time, a first section of the parachute strap and a second section of the parachute strap are both secured independently of each other; and at a second point in time, the second section of the parachute strap is still secured while the first section of the parachute strap is released where the released first section of the parachute strap gradually becomes taut as the parachute is extracted. Naturally, in some embodiments, there may be multiple parachute straps and/or segments that couple the parachute to an aircraft and/or are configured and/or designed in this manner.

It may be helpful to illustrate some examples of parachute strap(s) that are configured or otherwise designed in this manner. The following figures show some such examples.

Figure 3A:
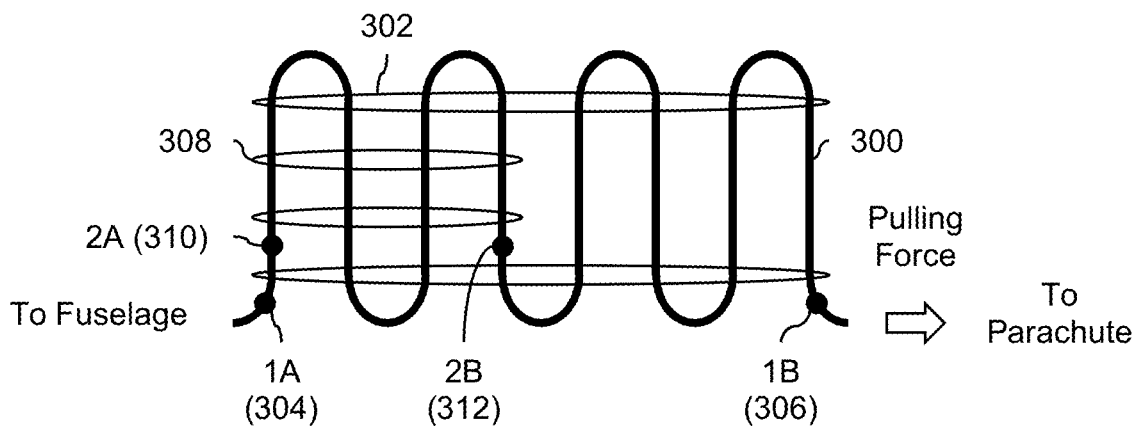
FIG. 3A is a diagram illustrating an embodiment of a parachute strap that is secured using bindings with progressive and/or multiple stages of release at a first point in time.

FIG. 3A is a diagram illustrating an embodiment of a parachute strap that is secured using bindings with progressive and/or multiple stages of release at a first point in time. In this example, the parachute strap (300) has a width on the order of an inch or two wide and is shown from the side. In this example, the parachute strap (300) sits between the fuselage and the parachute (canopy). Beyond the parachute (canopy), not shown, is another line or strap, not shown, which couples the parachute (canopy) to the rockets. In this example, the parachute strap is wound, folded, or otherwise bundled and then secured using the bindings. For clarification and visibility, an exploded view is shown with loose ties (302 and 308) and the back-and-forth folds of the parachute strap uncompressed but in a real-world application, the bindings would be tight in order to secure the parachute strap. In various embodiments, the parachute strap is made of nylon, Kevlar, polyester, etc.

In this example, there are two sets of bindings that are used to secure the parachute strap. A first set of bindings (302) are used to secure a first section of the parachute strap that runs (approximately) between point 1A (304) and point 1B (306). This section of strap is one example of a first section of a parachute strap that is referred to in step 202 in FIG. 2. In various embodiments, the bindings (302 and 308) may be made of a variety of materials, including but not limited to a plastic tie, hook and loop, elastic cord, etc.

A second set of bindings (308) is used to secure a second, shorter section of the parachute strap that runs (approximately) between point 2A (310) and point 2B (312). This section of the parachute strap is an example of the second section referred to in step 202 in FIG. 2. It is noted that in this example at least, the first set of bindings (302) and the second set of bindings (308) secure some overlapping portion of the parachute strap (e.g., roughly the section between point 2A (310) to point 2B (312)). To put it another way, the first section and the second section overlap (at least in some embodiments).

Figure 3B:
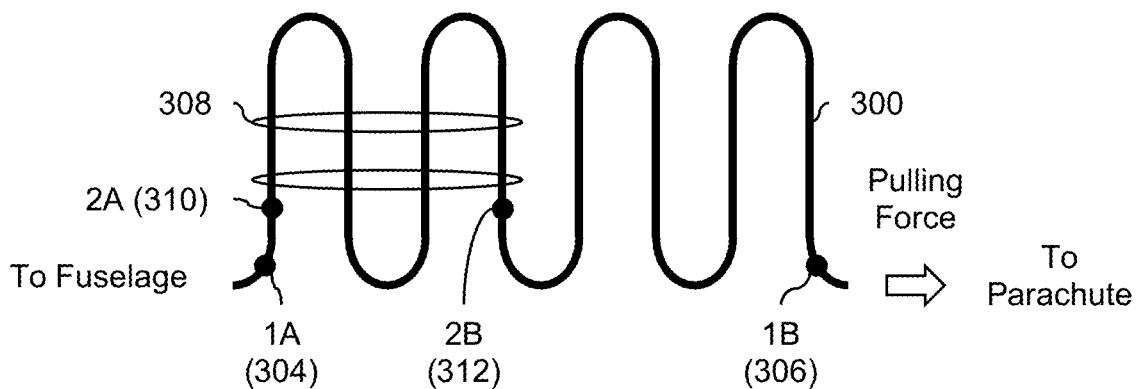
FIG. 3B is a diagram illustrating an embodiment of a parachute strap that is secured using bindings with progressive and/or multiple stages of release at a second point in time.

FIG. 3B is a diagram illustrating an embodiment of a parachute strap that is secured using bindings with progressive and/or multiple stages of release at a second point in time. When the rocket in the BRS is ignited, the rocket will begin to pull on the parachute strap (300) from the right in the diagram shown here (i.e., the parachute end as opposed to the fuselage end). This pulling force on that end of the parachute strap will cause the first set of bindings (302) to break or slip free which permits a section of the parachute strap roughly from point 1B (306) to point 2B (312) to be unsecured or otherwise loose. This is the state shown here (e.g., where the section of the parachute strap between point 1B (306) and point 2B (312) is unsecured and that unsecured section is slack.

Figure 3C:
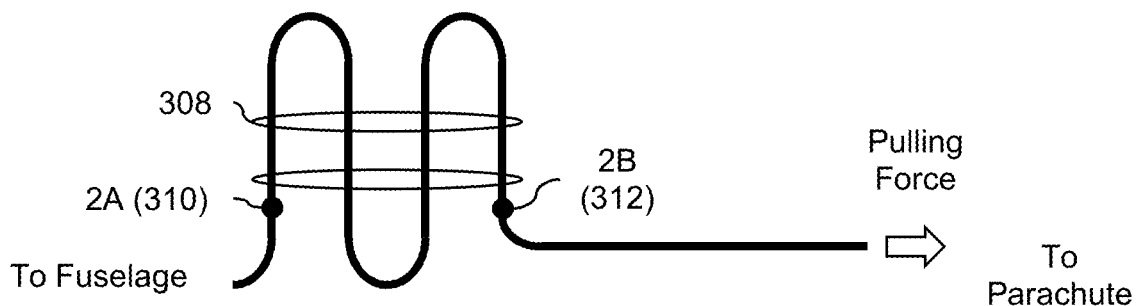
FIG. 3C is a diagram illustrating an embodiment of a parachute strap that is secured using bindings with progressive and/or multiple stages of release at a second point in time.

FIG. 3C is a diagram illustrating an embodiment of a parachute strap that is secured using bindings with progressive and/or multiple stages of release at a third point in time. The rocket will continue pulling on the parachute strap (e.g., via the parachute) until any slack and unsecured portion of the parachute strap (e.g., between point 1B (306) to point 2B (312) in FIG. 3C) is taut as is shown here. At that point, the second set of bindings (308) will break or slip free (not shown here), releasing the remaining portion of the parachute strap (e.g., between point 2A (310) and point 2B (312)) so that that section is released and slack. The rocket will continue pulling on the at least partially slack parachute strap (now unbound along its entire length) until the entire length is taut and rocket is decoupled or otherwise released from the rest of the BRS.

By having two sets of bindings (and thus two stages of release), the entirety of the parachute strap is not unbound and slack all at once during the earlier stages of parachute (canopy) extraction soon after the rocket is ignited. For example, a naive approach would be to have bindings that all go around all of the folds of the parachute strap and release all at the same time. This means that very early on, the entire length of the parachute strap is unbound. Returning briefly to FIG. 1, releasing the entirety of the parachute strap all at once increases the likelihood that the parachute strap will become tangled in the pusher prop (102). In contrast, if the parachute strap is released in stages (e.g., per the example of FIGS. 3A-3C), then the effective length of the unbound and slack parachute strap is much shorter, reducing the likelihood that the parachute strap will become tangled in the pusher prop (or any other part of the aircraft). This is especially true for the aircraft shown in FIG. 1 when the pusher prop is on because the pusher prop is directly behind the BRS and the forward movement of the vehicle may make the slack parachute strap especially vulnerable to getting blown back and tangling in the pusher prop.

The parachute strap in some applications may be more susceptible to tangling compared to the strap between the rocket and the parachute (canopy). The former may be much longer than the latter, making it more susceptible to tangling in the aircraft's pusher prop or other parts of the aircraft.

For simplicity and ease of explanation, a single parachute strap (300) is shown here but the techniques described herein may be extended to other embodiments (e.g., where there are multiple parachute straps running in parallel to each other between the parachute (canopy) and the fuselage). Similarly, although four bindings with two release stages or groups are shown here, any number of bindings and/or stages may be used.

This example shows one embodiment where the first section of the parachute strap (e.g., referred to in step 202 of FIG. 2) and the second section of the parachute strap (e.g., referred to in step 202 of FIG. 2) overlap, the first section of the parachute strap is bound by a first set of one or more bindings (e.g., 302 in FIGS. 3A-3C) around the first section of the parachute strap, and the second section of the parachute strap is bound by a second set of one or more bindings (e.g., 308 in FIGS. 3A-3C) around the second section of the parachute strap.

This configuration may be attractive in applications where a specific harness routing and/or fuselage constraints make this configuration more attractive than some other configurations. For example, in this configuration, the parachute strap is not attached to anything else (e.g., the parachute strap is not attached to the interior surface of the fuselage or the parachute bag). This embodiment may be attractive when the BRS is not located near the fuselage wall or parachute bag and/or when some opening in the fuselage (e.g., through which the parachute canopy and parachute lines exit the interior of the fuselage) is not located over the fuselage wall or parachute bag (e.g., the bundled straps are positioned in the center of the opening so they do not rub against the edge of the opening).

The following figure shows another embodiment where the different sets of bindings secure non-overlapping sections of the parachute strap.

Figure 4A:
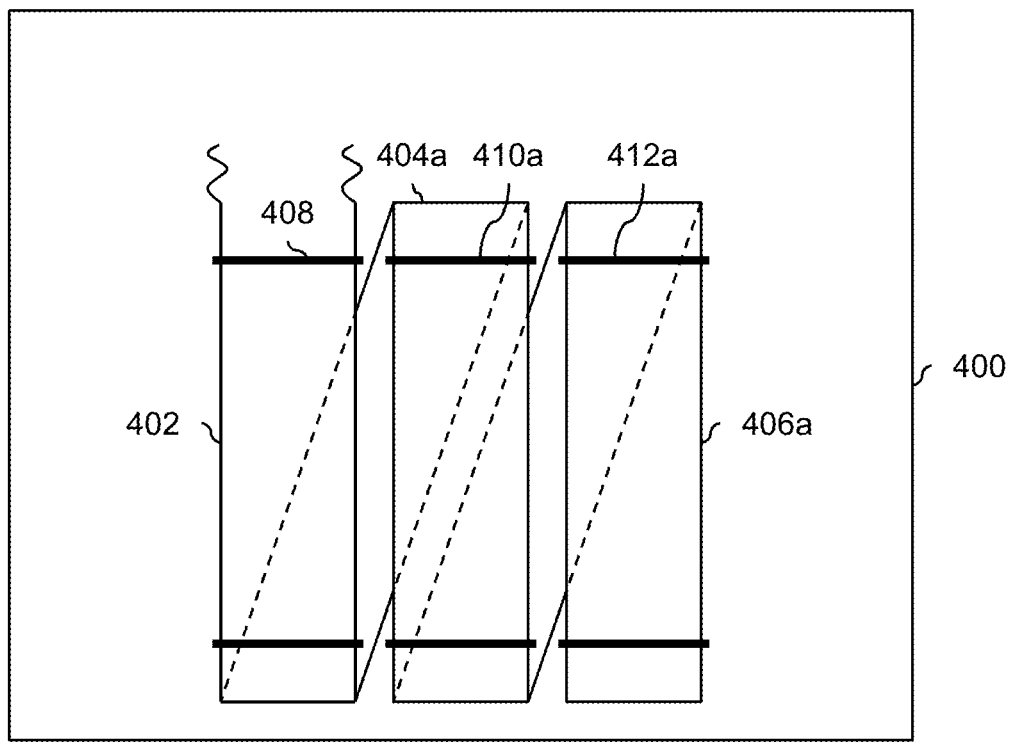
FIG. 4A is a diagram illustrating an embodiment of a parachute strap that is secured in non-overlapping sections using bindings with progressive and/or multiple stages of release.

FIG. 4A is a diagram illustrating an embodiment of a parachute strap that is secured in non-overlapping sections using bindings with progressive and/or multiple stages of release. In various embodiments, the parachute strap is secured against some backing or surface (400) such as the interior surface of the fuselage (400). In some other embodiments, the parachute strap is secured to or against some other surface or backing, such as the parachute bag which holds the parachute canopy. As in FIGS. 3A-3C, the parachute strap is folded in a back-and-forth pattern, but in this example the parachute strap is divided into three sections or stacks (e.g., each stack having folds of the parachute strap beneath the top surfaces shown here): a first section or stack (402), followed by a second section or stack (404a), and then a third section or stack (406a).

In the state shown here, all of the bindings (which wrap around a bundle of parachute strap) are secured. The first stack (402) is secured (e.g., against the inner surface of the fuselage) by a first set of bindings (408), the second stack (404a) is secured by a second set of bindings (410a), and the third stack (406a) is secured by a third set of bindings (412a). As the rocket pulls on the parachute (canopy), the first stack (402) will be pulled from above, causing the first set of bindings (408) to break or otherwise release. The following figure shows the system after the first set of bindings (408) break and the slack in that portion of the parachute strap (i.e., previously in the first stack (402)) becomes taut.

Figure 4B:
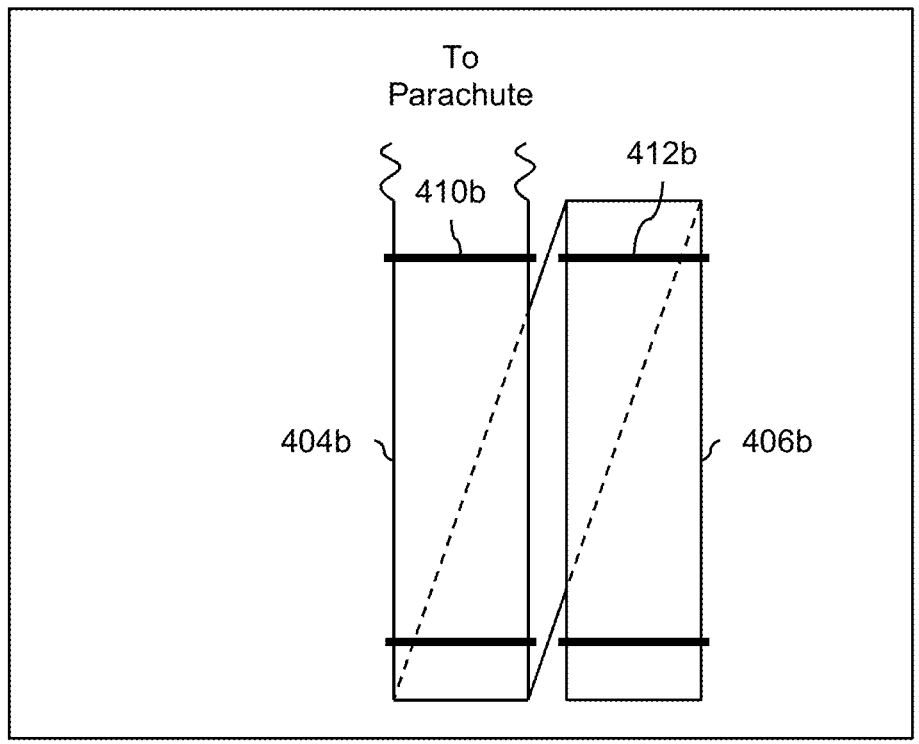
FIG. 4B is a diagram illustrating an embodiment of a parachute strap that is secured in non-overlapping sections after a first set of bindings breaks or otherwise releases.

FIG. 4B is a diagram illustrating an embodiment of a parachute strap that is secured in non-overlapping sections after a first set of bindings breaks or otherwise releases. In the state shown here, the first set of bindings (408 in FIG. 4A) has broken or otherwise released and that section of parachute strap (e.g., previously in the first stack (402) in FIG. 4A) is now pulled taut from above by the rocket via the parachute (canopy). As the rocket continues to pull on the parachute (canopy), the pressure eventually causes the second set of bindings (410b) to break or release, releasing the next section of parachute strap (e.g., currently in the second stack (404b)). Similarly, the third set of bindings (412b) will eventually break or release, releasing the last section of parachute strap currently in the third stack (406b). Similar to above, this causes the parachute strap to be released in stages instead of all at once. This shortens the effective length of any loose or slack parachute strap, reducing the likelihood that the parachute strap will be tangled in the pusher prop or any other part of the aircraft.

This example shows an embodiment where the first section of the parachute strap (e.g., 402 in FIG. 4A) and the second section of the parachute strap (e.g., 404a and 404b in FIG. 4A and FIG. 4B, respectively) do not overlap, the first section of the parachute strap is bound by a first set of one or more bindings (e.g., 408 in FIG. 4A) that tie the first section of the parachute strap to a surface (e.g., 400 in FIG. 4A), and the second section of the parachute strap is bound by a second set of one or more bindings (e.g., 410a and 410b in FIG. 4A and FIG. 4B, respectively) that tie the second section of the parachute strap to the surface.

As described above, this specific configuration may be attractive in certain applications depending upon the specific harness routing and/or fuselage constraints. For example, if a surface is attached is conveniently located (e.g., the position avoids any "jogs" or potential places where the parachute strap can snag, if the surface is beneath an opening in the fuselage through which the parachute canopy and parachute straps will exit, etc.) then attaching the straps to a surface as shown here may be attractive.

In some embodiments, individual ties (e.g., between some anchor point and a point along the parachute strap) are used. The following figure shows one example of this.

Figure 5:
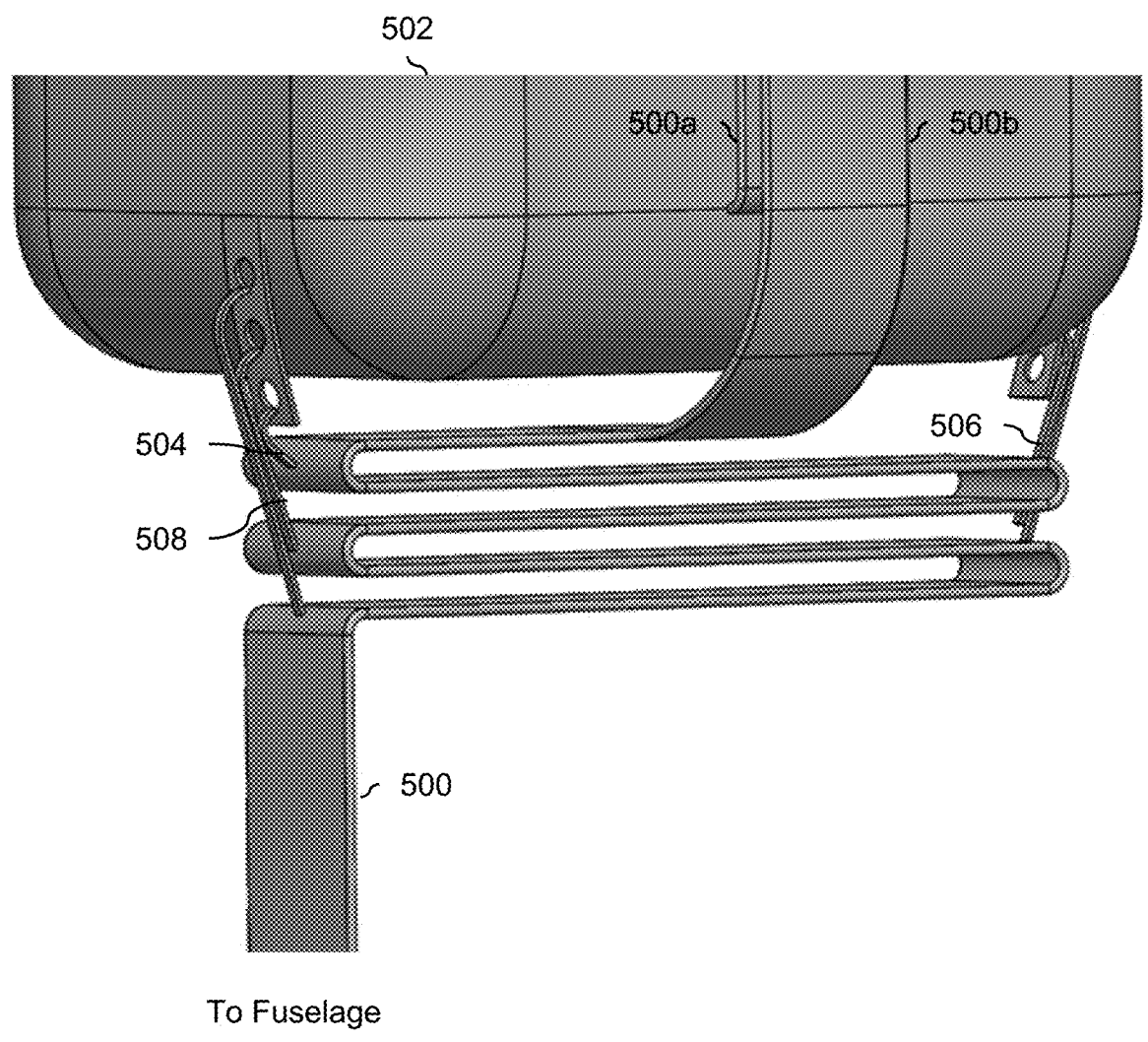
FIG. 5 is a diagram illustrating an embodiment of a parachute strap that is secured using point-to-point ties to a specific point along the parachute strap.

FIG. 5 is a diagram illustrating an embodiment of a parachute strap that is secured using point-to-point ties to a specific point along the parachute strap. In this example, the parachute strap (500) is secured outside of parachute bag (502) that is used to hold the parachute (canopy). For clarity, since it may not be readily apparent due to the cropping of this image, the section of the parachute strap at the top of the image (500b) continues upwards (not shown) and then folds back down, continuing as section 500a before going into the parachute bag (502) where the parachute strap connects to the parachute canopy (not shown).

The pulling force from the rocket (not shown) will cause the first point-to-point tie 504, connected to the topmost bend or fold in the parachute strap, to break or otherwise release first. In some embodiments, the point-to-point tie is a load rated string (e.g., secured or tied off at each end), which breaks at some specified load. This releases a first section of the parachute strap (e.g., up to the second point-to-point tie (506) which is still secured) so that the entirety of the parachute strap is not released all at once.

Subsequently, the second point-to-point tie (506), which connects the second-from-top bend or fold in the parachute strap to its anchor point or loop, will break or release, releasing more of the parachute strap. The lengths of the point-to-point tie are scaled accordingly so that the first point-to-point tie (504) is shorter than (as an example) the third point-to-point tie (508) due to the different lengths or distances each needs to span.

This example shows one embodiment where the first section of the parachute strap (e.g., between point-to-point ties 504 and 506) and the second section of the parachute strap (e.g., between point-to-point ties 506 and 508) do not overlap, the first section of the parachute strap is between: (1) a first point along the parachute strap which a first point-to-point tie (e.g., 504) connects to a first anchor point and (2) a second point along the parachute strap which a second point-to-point tie (e.g., 506) connects to a second anchor point; and the second section of the parachute strap is between: (1) the second point along the parachute strap and (2) a third point along the parachute strap which a third point-to-point tie (e.g., 508) connects to a third anchor point.

In some embodiments, the parachute strap is secured against some surface or substrate (e.g., without being coiled or folded in a back-and-forth manner). The following figures show some examples of this.

Figure 6:
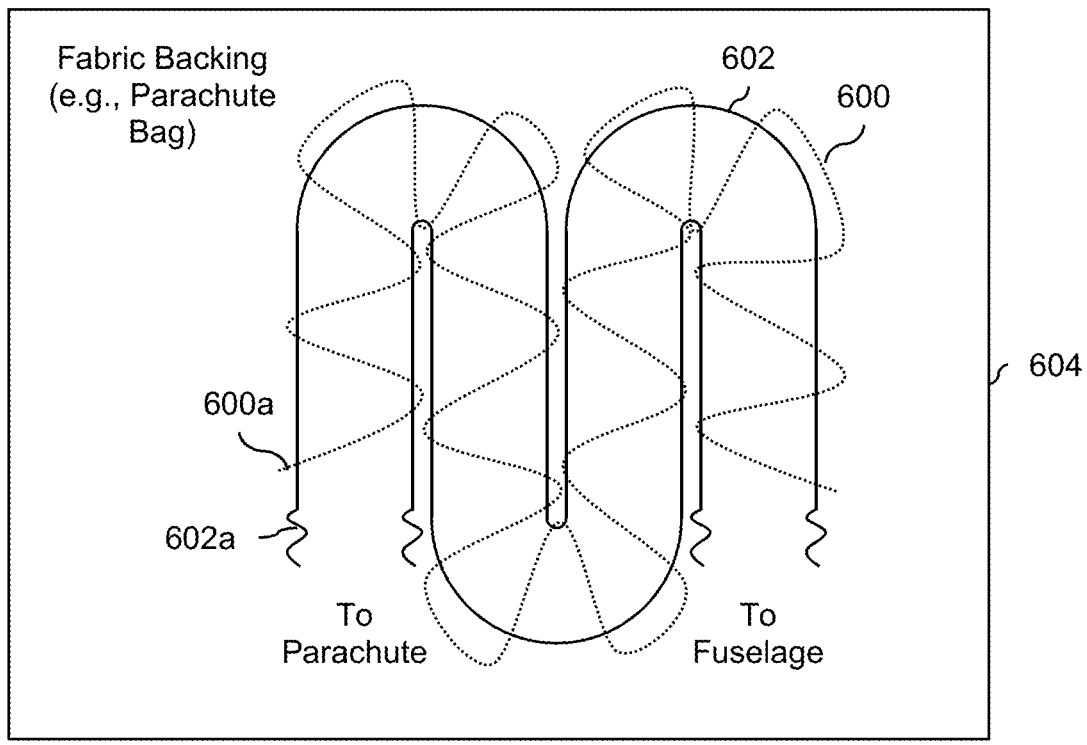
FIG. 6 is a diagram illustrating an embodiment of a parachute strap that is secured by sewing it to a piece of fabric.

FIG. 6 is a diagram illustrating an embodiment of a parachute strap that is secured by sewing it to a piece of fabric. In this example, the parachute strap (602) is sewn to a fabric backing (604), such as the parachute bag since the parachute bag is made of fabric and is already part of the BRS. For simplicity and ease of explanation, the stitching (600) used to sew the parachute strap (602) to the fabric is a single piece of string. In some other embodiments, multiple sections or pieces of string are used. In this example, the parachute strap is laid out in its entirety prior to stitching (e.g., without any bundling or coiling, at least in this example) but in some other embodiments section(s) may be bundled or coiled (e.g., if the available surface area of the fabric is too small to fit the entire parachute strap). As before, the rocket will pull on the parachute (canopy) which in turn will cause one end of the parachute strap (e.g., 602a) to be pulled on. The stitching at that end (e.g., 600a) will be pulled out of the fabric, releasing the parachute strap gradually as the stitching is gradually pulled out.

This example shows one embodiment where the first section of the parachute strap and the second section of the parachute strap are sewn to a fabric backing (e.g., a parachute bag) using one or more pieces of string.

Figure 7A:
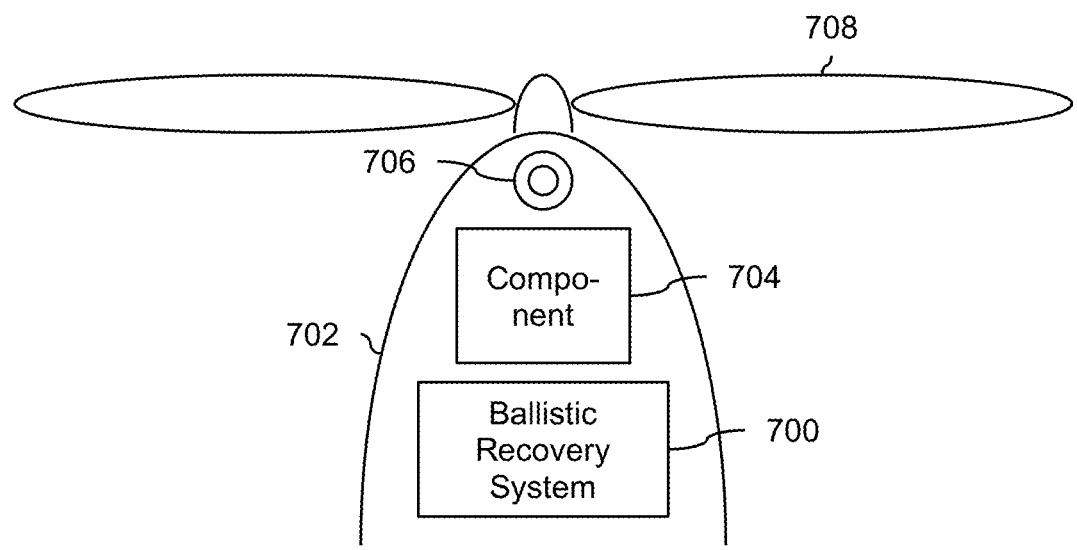
FIG. 7A is a diagram illustrating an embodiment of components in a fuselage.

FIG. 7A is a diagram illustrating an embodiment of components in a fuselage. In this example, the components inside of the aircraft from FIG. 1 are shown from a top view. A ballistic recovery system (700) is located inside of the fuselage (702). Behind the ballistic recovery system (700) is some other aircraft component (704) such as a battery, a motor for the pusher prop, etc. To state it more clearly, the interior of the fuselage is tightly packed and there is very little space between components. Behind the component (704) is the anchor point (706). This is the point to which the parachute strap(s) (not shown) is/are attached to the fuselage. For context, the pusher prop (708) is also shown outside of the fuselage at the rear of the aircraft.

A (potential) problem with this arrangement is that the parachute strap(s) (which run between the ballistic recovery system (700) and the anchor point (706)) may become snagged and/or torn on the sharp corners and/or frame of the component (704) when the parachute is inflated. In some embodiments, the parachute strap(s) are attached or otherwise anchored to the interior surface of the fuselage in a manner that both reduces the likelihood of tangling with the pusher prop (708) as well as reducing the likelihood of snagging and/or tearing on the component (704) in configurations such as the one shown. The following figure illustrates one such embodiment.

Figure 7B:
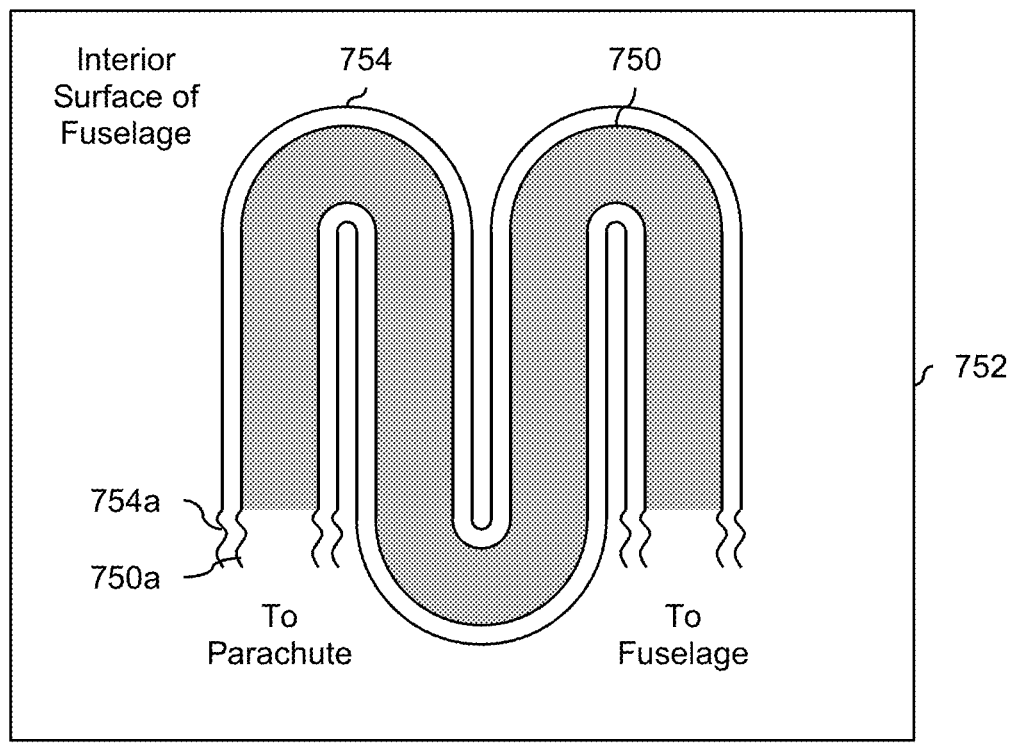
FIG. 7B is a diagram illustrating an embodiment of a parachute strap that is attached to the interior surface of the fuselage.

FIG. 7B is a diagram illustrating an embodiment of a parachute strap that is attached to the interior surface of the fuselage. In this example, the parachute strap (750) is placed against the interior surface of the fuselage (752). A covering (754) is then placed over the parachute strap (750) to hold the parachute strap in place against the wall. In various embodiments, the covering may be a tape or other adhesive, a layer of composite, etc. When the end of the parachute strap on the parachute side (750a) is pulled, the covering at that end (754a) will begin to be pulled off. As before, the example shown herein may be modified in a variety of ways (e.g., instead of a single piece of covering, multiple pieces or sections of covering are used).

This example shows one embodiment where the first section of the parachute strap and the second section of the parachute strap are attached to an interior surface of a fuselage using one or more pieces of covering (e.g., tape, an adhesive, and/or a composite, etc.).

Returning briefly to FIG. 7A, attaching the parachute strap(s) to the interior surface of the fuselage (702) keeps the parachute strap(s) (not shown) away from the sharp corners of the component (704). Furthermore, since the parachute strap(s) are released gradually, this also prevents tangling in the pusher prop (708).

In some embodiments, the parachute strap(s) is/are made of both Kevlar and steel straps to avoid pinch points (e.g., between the top corners of the component (704) and the interior surface of the fuselage (702) where the gap between the two narrows) and sharp edges (e.g., of the component (704)). For example, the steel straps may be covered by a layer and/or coating of Kevlar which is smooth and permits the parachute strap(s) to slip by any pinch points and/or sharp edges.

In some embodiments, a parachute strap is stronger (e.g., thicker and/or harder to cut) closer towards the fuselage than towards the parachute. As described above, the parts of the parachute strap(s) that are closest to the fuselage may be more susceptible to tearing and/or snagging on pinch points and/or sharp edges. To address this, the parachute strap (e.g., the bottom 0-15 feet) is designed to be more durable and/or tougher. For example, the parachute strap may be thicker towards the bottom and/or made of stronger material(s) such as steel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a rocket;
   a parachute, wherein the parachute is coupled to the rocket and the parachute is extracted by having the rocket pull on the parachute; and
   a parachute strap that couples the parachute to an aircraft, wherein:
     at a first point in time, a first section of the parachute strap and a second section of the parachute strap are both secured independently of each other,
     wherein the first section of the parachute strap and the second section of the parachute strap are sewn to a fabric backing, including a parachute bag, using one or more pieces of string; and at a second point in time, the second section of the parachute strap is still secured while the first section of the parachute strap is released where the released first section of the parachute strap gradually becomes taut as the parachute is extracted.

2. The system of claim 1, wherein:
the first section of the parachute strap and the second section of the parachute strap do not overlap;
the first section of the parachute strap is bound by a first set of one or more bindings that tie the first section of the parachute strap to a surface; and
the second section of the parachute strap is bound by a second set of one or more bindings that tie the second section of the parachute strap to the surface.

3. The system of claim 1, wherein:
the first section of the parachute strap and the second section of the parachute strap do not overlap;
the first section of the parachute strap is between: (1) a first point along the parachute strap which a first point-to-point tie connects to a first anchor point and (2) a second point along the parachute strap which a second point-to-point tie connects to a second anchor point; and
the second section of the parachute strap is between (1) the second point along the parachute strap and (2) a third point along the parachute strap which a third point-to-point tie connects to a third anchor point.

4. The system of claim 1, wherein the first section of the parachute strap and the second section of the parachute strap are attached to an interior surface of a fuselage using one or more pieces of covering.

5. The system of claim 1, wherein the first section of the parachute strap and the second section of the parachute strap are attached to an interior surface of a fuselage using one or more pieces of covering, including one or more of the following: tape, an adhesive, or a composite.

6. The system of claim 1, wherein the parachute strap includes steel.

7. The system of claim 1, wherein the parachute strap is stronger towards a fuselage than towards the parachute.

8. A method, comprising:
providing a rocket and a parachute, wherein the parachute is coupled to the rocket and the parachute is extracted by the rocket pulling on the parachute; and
providing a parachute strap that couples the parachute to an aircraft, wherein:
at a first point in time, a first section of the parachute strap and a second section of the parachute strap are both secured independently of each other,
wherein the first section of the parachute strap and the second section of the parachute strap are sewn to a fabric backing, including a parachute bag, using one or more pieces of string; and
at a second point in time, the second section of the parachute strap is still secured while the first section of the parachute strap is released where the released first section of the parachute strap gradually becomes taut as the parachute is extracted.

9. The method of claim 8, wherein:
the first section of the parachute strap and the second section of the parachute strap do not overlap;
the first section of the parachute strap is bound by a first set of one or more bindings that tie the first section of the parachute strap to a surface; and
the second section of the parachute strap is bound by a second set of one or more bindings that tie the second section of the parachute strap to the surface.

10. The method of claim 8, wherein:
the first section of the parachute strap and the second section of the parachute strap do not overlap;
the first section of the parachute strap is between: (1) a first point along the parachute strap which a first point-to-point tie connects to a first anchor point and (2) a second point along the parachute strap which a second point-to-point tie connects to a second anchor point; and
the second section of the parachute strap is between (1) the second point along the parachute strap and (2) a third point along the parachute strap which a third point-to-point tie connects to a third anchor point.

11. The method of claim 8, wherein the first section of the parachute strap and the second section of the parachute strap are attached to an interior surface of a fuselage using one or more pieces of covering.

12. The method of claim 8, wherein the first section of the parachute strap and the second section of the parachute strap are attached to an interior surface of a fuselage using one or more pieces of covering, including one or more of the following: tape, an adhesive, or a composite.

13. The method of claim 8, wherein the parachute strap includes steel.

14. The method of claim 8, wherein the parachute strap is stronger towards a fuselage than towards the parachute.

15. A system, comprising:
a rocket;
a parachute, wherein the parachute is coupled to the rocket and the parachute is extracted by having the rocket pull on the parachute; and
a parachute strap that couples the parachute to an aircraft, wherein:
at a first point in time, a first section of the parachute strap and a second section of the parachute strap are both secured independently of each other,
wherein the first section of the parachute strap and the second section of the parachute strap are attached to an interior surface of a fuselage using one or more pieces of covering; and
at a second point in time, the second section of the parachute strap is still secured while the first section of the parachute strap is released where the released first section of the parachute strap gradually becomes taut as the parachute is extracted.

16. The system of claim 15, wherein:
the first section of the parachute strap and the second section of the parachute strap do not overlap;
the first section of the parachute strap is bound by a first set of one or more bindings that tie the first section of the parachute strap to a surface; and
the second section of the parachute strap is bound by a second set of one or more bindings that tie the second section of the parachute strap to the surface.

17. The system of claim 15, wherein:
the first section of the parachute strap and the second section of the parachute strap do not overlap;
the first section of the parachute strap is between: (1) a first point along the parachute strap which a first point-to-point tie connects to a first anchor point and (2) a second point along the parachute strap which a second point-to-point tie connects to a second anchor point; and
the second section of the parachute strap is between (1) the second point along the parachute strap and (2) a third point along the parachute strap which a third point-to-point tie connects to a third anchor point.

18. The system of claim 15, wherein the first section of the parachute strap and the second section of the parachute strap are sewn to a fabric backing using one or more pieces of string.

19. The system of claim 18, wherein the first section of the parachute strap and the second section of the parachute strap are sewn to a fabric backing, including a parachute bag, using one or more pieces of string.

20. The system of claim 18, wherein one or more pieces of covering include one or more of the following: tape, an adhesive, or a composite.

21. The system of claim 18, wherein the parachute strap includes steel.

22. The system of claim 18, wherein the parachute strap is stronger towards the fuselage than towards the parachute.

23. A method, comprising:
providing a rocket and a parachute, wherein the parachute is coupled to the rocket and the parachute is extracted by the rocket pulling on the parachute; and
providing a parachute strap that couples the parachute to an aircraft, wherein:
at a first point in time, a first section of the parachute strap and a second section of the parachute strap are both secured independently of each other,
wherein the first section of the parachute strap and the second section of the parachute strap are attached to an interior surface of a fuselage using one or more pieces of covering; and
at a second point in time, the second section of the parachute strap is still secured while the first section of the parachute strap is released where the released first section of the parachute strap gradually becomes taut as the parachute is extracted.

24. The method of claim 23, wherein:
the first section of the parachute strap and the second section of the parachute strap do not overlap;
the first section of the parachute strap is bound by a first set of one or more bindings that tie the first section of the parachute strap to a surface; and
the second section of the parachute strap is bound by a second set of one or more bindings that tie the second section of the parachute strap to the surface.

25. The method of claim 23, wherein:
the first section of the parachute strap and the second section of the parachute strap do not overlap;
the first section of the parachute strap is between: (1) a first point along the parachute strap which a first point-to-point tie connects to a first anchor point and (2) a second point along the parachute strap which a second point-to-point tie connects to a second anchor point; and
the second section of the parachute strap is between (1) the second point along the parachute strap and (2) a third point along the parachute strap which a third point-to-point tie connects to a third anchor point.

26. The method of claim 23, wherein the first section of the parachute strap and the second section of the parachute strap are sewn to a fabric backing using one or more pieces of string.

27. The method of claim 23, wherein the first section of the parachute strap and the second section of the parachute strap are sewn to a fabric backing, including a parachute bag, using one or more pieces of string.

28. The method of claim 23, wherein one or more pieces of covering include one or more of the following: tape, an adhesive, or a composite.

29. The method of claim 23, wherein the parachute strap includes steel.

30. The method of claim 23, wherein the parachute strap is stronger towards the fuselage than towards the parachute.

* * * * *